Nov. 9, 1965  F. HENNEQUIN  3,216,152
SURFACING OF GLASS
Filed Feb. 13, 1961  4 Sheets-Sheet 1
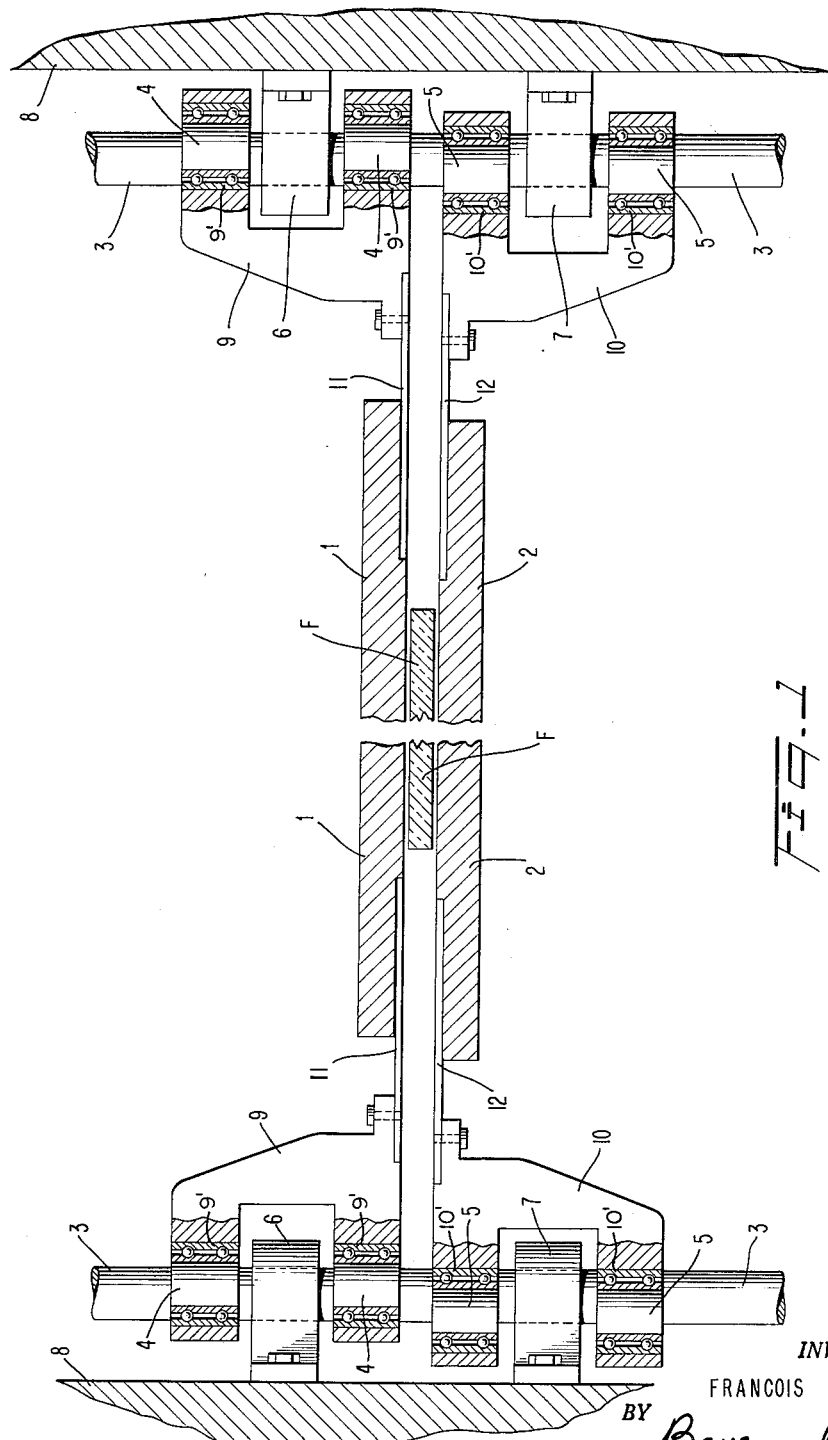
INVENTOR.
FRANCOIS HENNEQUIN
BY
Bauer and Seymour
ATTORNEYS

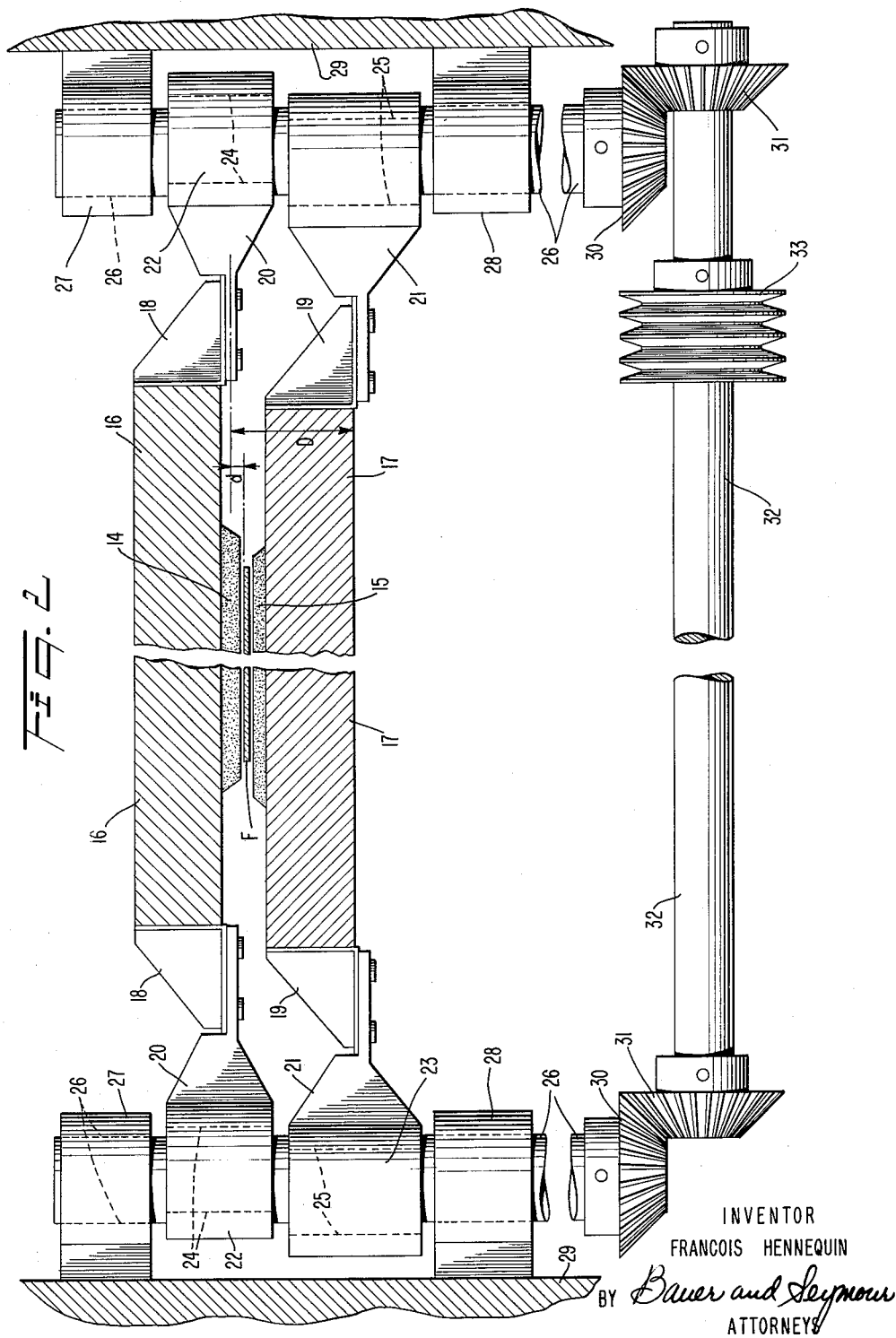

Nov. 9, 1965   F. HENNEQUIN   3,216,152
SURFACING OF GLASS
Filed Feb. 13, 1961   4 Sheets-Sheet 3
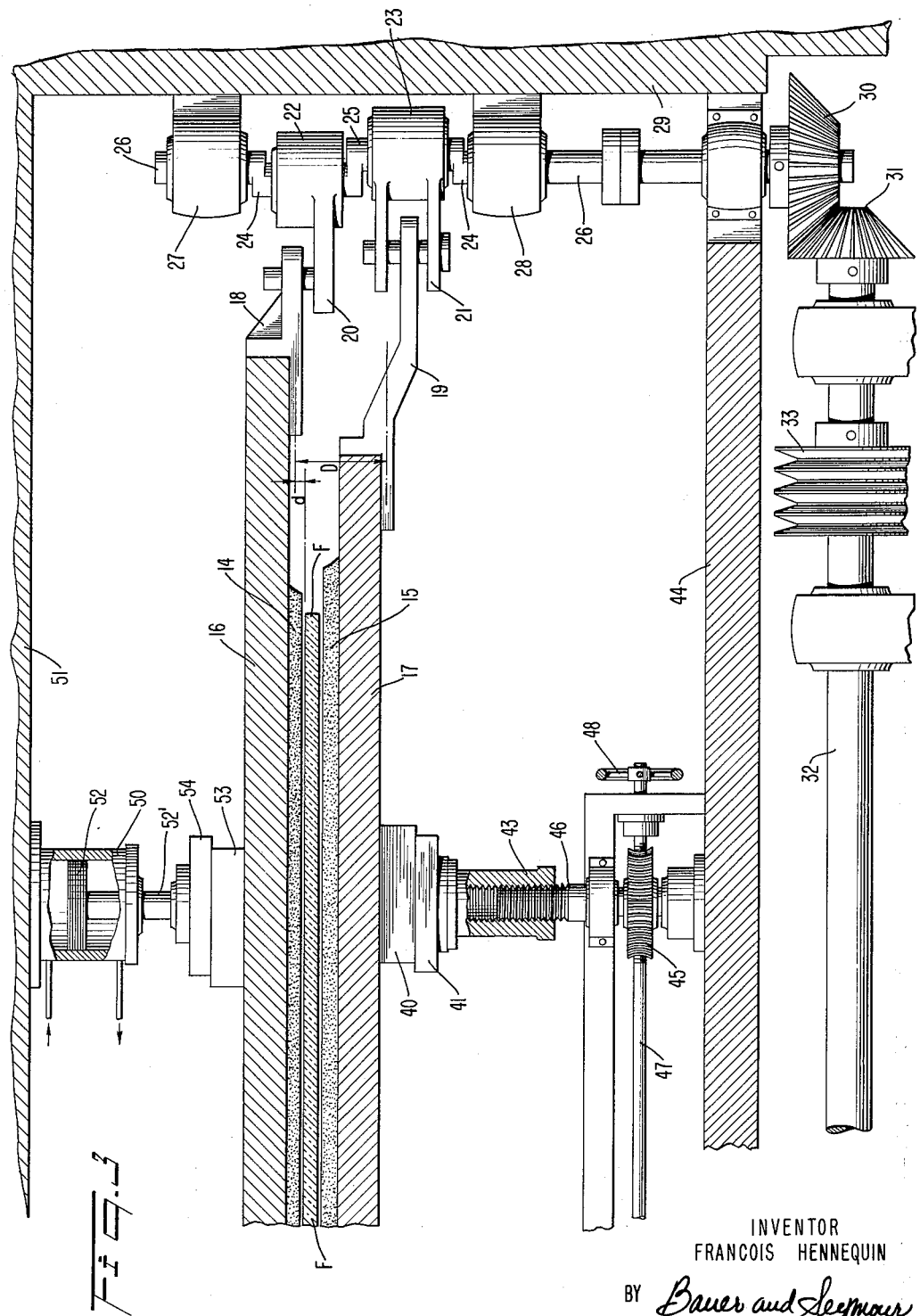
INVENTOR
FRANCOIS HENNEQUIN
BY *Bauer and Seymour*
ATTORNEYS

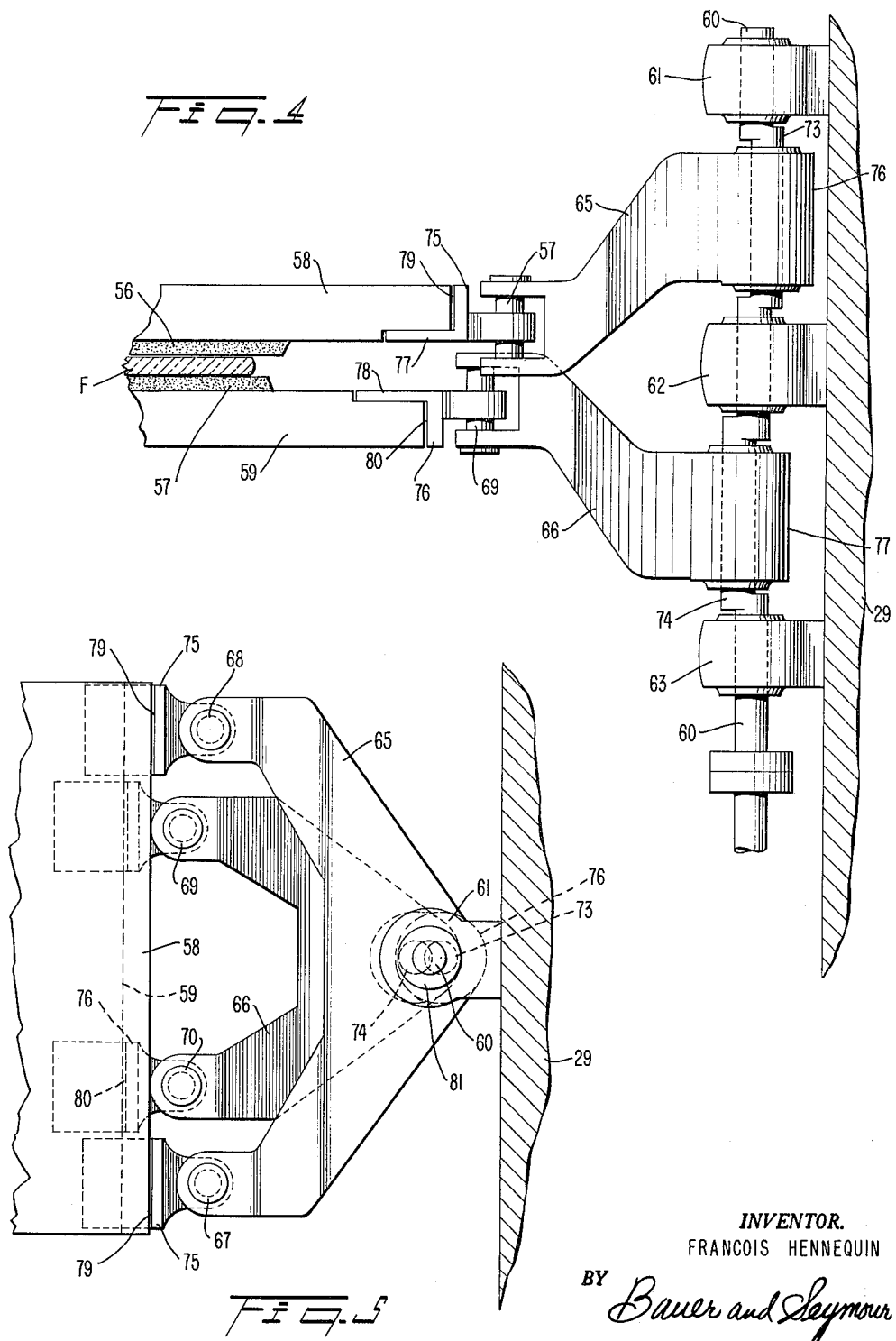

United States Patent Office 3,216,152
Patented Nov. 9, 1965

3,216,152
SURFACING OF GLASS
François Hennequin, Milan, Italy, assignor to Compagnie
de Saint-Gobain, Neuilly-sur-Seine, France
Filed Feb. 13, 1961, Ser. No. 88,735
Claims priority, application France, Feb. 19, 1960,
818,982
8 Claims. (Cl. 51—112)

This invention relates to the grinding and polishing of glass sheets by means of runners which move with translatory motion, all the points of a runner thus describing substantially identical, closed curves, parallel to a given directrix, usually circles. Elongated rectangular members extending completely across the glass sheet, and driven by eccentrics mounted in their ends, are useful as grinding and polishing runners in such apparatus.

In order to obtain this motion it is sufficient to compel two points of the runner to describe identical closed curves in synchronism. The entrainment of these two points, for example, following the circumference of a circle, may be carried out by means of two arms which transmit to them the driving forces which are necessary for the execution of the movement and which must also overcome the forces of resistance generated by the friction of the runner on the glass and the inertia of the moving parts.

The maintenance of truly planar surfaces in the glass and the abrasive material which grinds or smooths the glass presents a problem when such apparatus is used. Furthermore, as glass and abrasive materials such as cast iron runner faces or felts are worn away, a problem of tool alignment arises. It is also true that the maintenance of uniform pressure is difficult, particularly when both faces of the glasses are worked at the same time.

The present invention has for an object to improve such apparatus and to reduce and overcome these several problems. The objects are accomplished, generally speaking, by applying the horizontal working forces to the runner at points situated in the plane of contact of the runner with the glass or at least in a plane parallel to the surface of the glass and very close to it. The applicant has discovered that the application of the drive in this location improves the grinding and polishing without increasing the expenditure of energy. This improvement includes the advantage that the reversing couple, established by the driving force and the resisting, frictional force, becomes zero or substantially so.

It is also a part of this invention that when the polishing is effectuated simultaneously on two sides of the glass sheet, the working plane of the lower runner shall occupy an exact unmoving position which precisely fixes its working plane, and that the working pressure is exercised on the upper runner by resilient means, for example, by fluid pressure such as by hydraulic or pneumatic jacks. In practice the distance between the working planes, and the planes of application of the upper and lower forces, should have a value which includes such necessities of construction as the thickness of the lower runner and that of the glass sheet. The plane of application of the lower, horizontal forces is to be located somewhat below the plane of the lower face of the glass sheet. Under these conditions the plane of application of the horizontal driving forces of the upper runner should be substantially aligned with the working plane, the plane of contact between runner and glass. This may be expressed by the relation $$\frac{d}{D} \leq \frac{1}{4}$$

in which $d$ is the distance, if any, between the plane in which the horizontal driving forces are applied to the upper runner and the working plane, and D is the distance between the horizontal planes in which the driving forces are applied to the upper and lower runners. As to the lower runner, the vertical position of which is fixed, fixing in turn the position of the moving glass sheet, the reactions which it undergoes during working are absorbed by a mechanical system which supports it in its fixed position.

The invention is illustrated in the annexed drawings.

FIG. 1 is a transverse elevation, partly in section and showing the preferred embodiment of the parts of the invention relating to the alignment of working planes and driving planes;

FIG. 2 is a view corresponding to FIGURE 1 wherein the means for driving the upper and lower runners has a slight displacement between the upper working and driving planes;

FIG. 3 is a transverse elevation of an apparatus of the type of FIG. 2 with means for supporting and vertically adjusting the plane of the lower runner, and including apparatus for effecting the applications of variable force upon the upper runner by fluid pressure, and FIGS. 4 and 5 are elevational and plan views of another embodiment of the invention.

Referring to the numerals of the drawing, the lower and upper runners 1, 2, respectively, which accomplish the grinding or polishing of the glass sheet F, are driven with translatory motion by a pair of shafts 3 which have eccentrics 4, 5 turning within bearings 9′, 10′, mounted on forks 9, 10 which support plates 11, 12 which are connected to the inner faces of the runners. The shafts 3 are mounted in fixed bearings 6, 7. The eccentrics 4, 5 have the same offset or eccentric radius and are mounted at 180° from each other. The arms 11, 12 upon which the driving forces are applied to the runners are situated, respectively, in the planes of the upper and lower faces of the glass sheet F.

In FIGS. 2 and 3 the sheet F is placed between felts 14 and 15 mounted on the runners 16, 17. At their extremities these rectangular runners are provided with angle irons 18, 19 rigidly attached to them and to bearings 20, 21, which are mounted on the eccentrics 24, 25 of a shaft 26, which are offset at 180° from each other. The shaft 26 rotates in bearings 27, 28 which are fixedly mounted. Each shaft 26 is driven by gears 30 which engage pinions 31 mounted on a shaft 32 which is provided with a driving pulley 33 which is driven from a reduction motor not shown. Referring to FIGURE 3, the lower runner is supported by relatively slidable plates 40, 41 which are in turn supported by adjustable screws 43 which bear upon the beam 44 which is integral with the frame 29 and permits the adjustment of the upper plate 40 in height to compensate for the wearing away of the glass and of felt 15. The adjustment in height is made by turning the gears 45 more or less, the gears 45 being keyed to the shafts of screws 46. There may be several of these adjustable supports under the lower runner, with aligned supporting faces, all operated from a single shaft 47 which may be turned by wheel 48 to drive a plurality of screws engaged with the plurality of gears 45. By turning this wheel the lower runner is raised or lowered vertically, parallel to the working plane.

The upper runner 16 has a felt 14 which, in order to polish the glass, must bear heavily on its surface. This force is obtained by means of one or more sets of bearing blocks 53, 54 which are applied against the upper runner by fluid pressure means such as piston 52 in the cylinder 50 operating through shaft 52′ against the upper block. This provides heavy but resilient pressure against the upper face and lower face of the glass, and, by supplying all cylinders from a single source of pressure, equalizes the pressure on the full width of the glass. The connections between the fittings 18, 19 on the ends of the runners and the plates 20, 21 which transmit the motions of the eccentrics, permits vertical movement of the runners without permitting undesirable play.

As indicated in FIGS. 2 and 3, the point of application of the horizontal driving forces to the upper runner is distant the quantity d from the upper surface of the glass sheet, and the distance between the points of application of the horizontal forces to the upper runner and the lower runner has a length D. If one admits, for example, for D a value of 20 centimeters, d should be inferior, or at most equal to, 5 centimeters.

With reference to FIGS. 4 and 5 for both the lower runner 59 with felt 57 and the upper runner 58 with felt 56, the driving forces are applied very near the contact plane of the runner with the glass, eliminating thus all reversing couple for the lower runner and for the upper runner.

According to said embodiment, the felts 56 and 57, fixed respectively to runners 58 and 59, are driven in circular translatory motion through V-shaped connectors or pitmans 65 and 66 mounted on driving shaft 60 rotating in bearings 61, 62, 63 fastened to the frame 29.

To enable the driving forces to be applied very close to the working plane, the connectors 65 and 66 are slightly imbricated one in the other, the connector 65 driving the upper runner 58 by means of external crank-pins 67 and 68 and the connector 66 driving the lower runner 59 with internal crank-pins 69 and 70.

The working pressures may be transmitted in the same manner as for the embodiment of FIG. 3.

Instead of placing the crank-pins 69 and 70 of the under runner between the crank-pins 68 and 67 of the upper runner, it is possible to place said crank-pins alternately so that the crank-pins of one runner alternate with the crank-pins of the other runner, for example, by arranging the crank pins of FIG. 5 in the following order: 68 of the upper runner, 69 of the lower runner, 67 of the upper runner, 70 of the lower runner.

The invention is applicable to the polishing of a single side of the glass, as well as to the polishing of both faces simultaneously. The greatest use of the invention is in working the surfaces of contiuous, moving sheets as they issue from a furnace, but it is equally useful in application to single plates.

The invention includes an improvement in grinding and polishing apparatus for glass, including one or more runners animated by translatory motion, driving forces applied to their peripheries, and the application of the horizontal driving forces to a runner at points situated in the plane of the face of the glass worked by the runner, or in a plane parallel thereto and very close to it. When the invention is applied to the simultaneous polishing of both faces of a sheet of glass, the ratio $\frac{d}{D}$ should be not greater than $\frac{1}{4}$ d being the distance between a plane passing through the center of application of the horizontal driving force and the surface of the glass, and D the distance between the two planes which pass through the centers of the horizontal driving forces applied to the upper and lower runners.

As many apparently widely different embodiments of the present invention may be made without departing from the spirit and scope thereof, it is to be understood that the invention is not limited to the specific embodiments.

What is claimed is:

1. In an apparatus for surfacing a plane sheet of glass, a lower runner, an upper runner superposed over said lower runner in parallelism therewith, said runners being adapted and arranged to receive between them a glass sheet to be surfaced, power-driven means at each end edge of said runners and operable to synchronously oscillate the same, each in its own plane, in respectively equal and opposite closed paths, and connections between said power-driven means and said runners, and lying approximately in the upper and lower planar faces of said lower and upper runners, respectively, said connections applying oscillatory forces to said lower and upper runners lying only contiguous to and parallel with the upper and lower plane surfaces thereof.

2. In an apparatus for surfacing a ribbon-like sheet of glass moving horizontally in its own plane in the direction of its length, a lower runner having a plane upper face over which the sheet moves in contact therewith, means supporting said lower runner and operable to vertically adjust the same, an upper runner superposed over said lower runner in parallelism therewith for planar contact with the upper surface of the sheet, fluid pressure means engaging said upper runner and operable to vary the pressure on the sheet between said runners, first and second power-driven means at the respective ends of said runners and operable to oscillate the same, each in its own plane, synchronously in equal opposite closed paths, first connections between each said means and said lower runner and lying substantially in the plane of the face thereof nearest the sheet, and second connections between each said means and said upper runner and lying substantially in the plane of the face thereof nearest the sheet, each of said first and second connections applying to its respective runner oscillatory forces lying only in and parallel to the face thereof nearest the sheet.

3. In an apparatus for surfacing a ribbon-like plane sheet of glass moving horizontally in its own plane and in the direction of its length, a lower runner having a plane upper face over which the sheet moves in contact therewith, an upper runner superposed over said lower runner and having a plane lower face to contact the upper face of the sheet, a crankshaft journaled for rotation about a first vertical axis at one end of said runners and at one side edge of the sheet, said crankshaft having an upper throw above a first plane coincident with the lower face of said upper runner, and a lower throw below a second plane coincident with the upper face of said lower runner, a first V-shaped connector having its apex journaled on said upper throw and its arms offset downwardly and inwardly toward said upper runner a second V-shaped connector having its apex journaled on said lower throw and its arms offset upwardly and inwardly toward said lower runner, a first pair of pivotal connections between the contiguous end of said upper runner and the respective distal ends of the arms of said first connector, to apply oscillatory forces to said upper runner in said first plane, and a second pair of pivotal connections between the contiguous end of said lower runner and the respective distal ends of the arms of said second connector, to apply oscillatory forces to said lower runner in said second plane, each said pair of connections being spaced in said direction.

4. The apparatus of claim 3, one said pair of pivotal connections being positioned between the other said pair.

5. The apparatus of claim 3, said first pair of pivotal connections being positioned alternately with said second pair of pivotal connections.

6. In an apparatus for surfacing a ribbon-like plane sheet of glass moving horizontally in its own plane and in the direction of its length, a lower runner having a plane upper face over which the sheet moves in contact therewith, an upper runner superposed over said lower runner and having a plane lower face to contact the upper face of the sheet, first and second crankshafts each journaled for rotation about a fixed vertical axis at respective ends of said runners and at respective side edges of the sheet, each said crankshaft having an upper crank above a first plane coincident with the lower face of said upper runner, and a second crank below a second plane coincident with the upper face of said lower runner, a first pair of V-shaped connectors each journaled at its apex on a respective one of said upper cranks and having its arms offset downwardly and inwardly toward said runners to terminate substantially in said first plane, a second pair of V-shaped connectors each journaled at its apex on a respective one of said lower cranks, and having its arms offset upwardly and inwardly toward said runners, to terminate substantially in said second plane, first means pivoting the distal ends of the arms of said first pair of connectors to a respective end of said upper runner, and second means pivoting the distal ends of the arms of said second pair of connectors to a respective end of said lower runner, each said pair of connectors applying oscillatory forces to its runner substantially in said first and second planes, respectively.

7. The apparatus of claim 6, the arms of said second connectors at each end of said runners, and said first pivot means thereof, lying between the arms of said first connectors and said second pivot means thereof.

8. The apparatus of claim 7, means supporting said lower runner for oscillation in the plane of its upper face and adjustable to translate said lower runner in the direction normal to said plane, and fluid pressure means slidably engaging said upper runner on the top surface thereof and controllable to vary the pressure of said runners upon respective sides of the sheet.

References Cited by the Examiner
UNITED STATES PATENTS

| | | | |
|---|---|---|---|
| 1,909,902 | 5/33 | Ansler | 51—119 |
| 1,962,765 | 6/34 | Crowley et al. | 51—119 |
| 1,962,767 | 6/34 | Crowley et al. | 51—112 |
| 2,308,976 | 1/43 | Indge | 51—112 |
| 2,787,100 | 4/57 | Peyches | 51—119 |
| 2,949,707 | 8/60 | Staelin | 51—283 X |
| 2,955,389 | 10/60 | Thebault | 51—119 |
| 2,984,051 | 5/61 | Monnet et al. | 51—119 |

FOREIGN PATENTS 483,189    9/29    Germany.

LESTER M. SWINGLE, *Primary Examiner.*

FRANK E. BAILEY, FRANK H. BRONAUGH, J. SPENCER OVERHOLSER, *Examiners.*